United States Patent [19]

Tomarelli

[11] Patent Number: 5,000,975
[45] Date of Patent: Mar. 19, 1991

[54] RANDOMIZED PALM OIL FAT COMPOSITION FOR INFANT FORMULAS

[75] Inventor: Rudolph M. Tomarelli, Phoenixville, Pa.

[73] Assignee: American Home Products Corporation, New York, N.Y.

[21] Appl. No.: 291,904

[22] Filed: Dec. 29, 1988

[51] Int. Cl.⁵ ................................................ A23C 9/20
[52] U.S. Cl. ................................. 426/602; 426/607; 426/613; 426/801
[58] Field of Search ............... 426/613, 601, 602, 801, 426/607

[56] References Cited

U.S. PATENT DOCUMENTS

| | | | |
|---|---|---|---|
| 3,542,560 | 11/1970 | Tomarelli et al. | 99/63 |
| 3,649,295 | 3/1972 | Bernhart | 99/57 |
| 3,997,682 | 12/1976 | Allen | 426/601 |
| 4,112,123 | 9/1978 | Roberts | 426/72 |
| 4,216,236 | 8/1980 | Mueller | 426/801 |
| 4,282,265 | 8/1981 | Theuer | 426/607 |
| 4,614,663 | 9/1986 | Rule | 426/601 |
| 4,721,626 | 1/1988 | Rule | 426/601 |
| 4,753,926 | 6/1988 | Lucas | 426/801 |
| 4,944,944 | 7/1990 | Tang | 426/801 |

FOREIGN PATENT DOCUMENTS

| | | |
|---|---|---|
| 1577933 | 10/1980 | United Kingdom . |
| 2067587 | 7/1981 | United Kingdom . |
| 2084172 | 4/1982 | United Kingdom .......... 426/601 |
| 2178752 | 2/1987 | United Kingdom . |

OTHER PUBLICATIONS

Babayan, U. K., "Medium-Chain Triglyceride—Their Composition, Preparation, and Application", J. Am. Oil Chem. Soc., 45, 23–5, (1968).
Bach, A. C. and Babayan, U. K., "Medium-Chain Triglycerides: an Update", Am. J. of Clin. Nut., 36, 950-962, (1982).
Going, L. H., "Interesterification Products and Processes", J. Am. Oil Chem. Soc., 44, 414A–456A, 1967, (reprint of).

Primary Examiner—Carolyn Paden
Attorney, Agent, or Firm—Arthur G. Seifert

[57] ABSTRACT

Disclosed herein are all vegetable oil fat compositions having a randomized palmitic acid oil as the sole palmitic acid oil. The novel all vegetable oil fat compositions are particularly for use in human infant nutritional products and combine a lauric acid oil, an oleic acid oil and a linoleic acid oil with the randomized palmitic acid oil. Sunflower oleic oil and canola (LEAR) oil may be used as oleic acids oils. For preterm or low birth weight infants, medium-chain triglycerides (MCTs) are also included in the all vegetable oil fat compositions of the invention.

50 Claims, No Drawings

RANDOMIZED PALM OIL FAT COMPOSITION FOR INFANT FORMULAS

The invention disclosed herein comprises all vegetable oil fat compositions particularly for use in human infant nutritional products. This invention marks the first use of a randomized palmitic acid oil in the fat composition of an infant formula. A randomized palmitic acid oil is produced by catalytic interesterification of a native palmitic acid oil and is a chemically and physiologically different oil than the untreated native palmitic oil.

In the all vegetable oil fat compositions of the invention a randomized palmitic acid oil is the sole palmitic acid oil and is combined with a lauric acid oil, an oleic acid oil, and a linoleic acid oil. The invention additionally includes such all vegetable oil fat compositions with mediumchain triglycerides added, particularly for use in nutritional products for low birth weight or premature infants. The all vegetable oil fat compositions of the invention have a significant portion of their palmitic acid in the 2 position of the triglyceride, as does the fat of human milk, and are as well absorbed as the fat of human milk.

BACKGROUND OF THE INVENTION

Two all vegetable oil fat compositions comprised of four types of fatty acid oils disclosed recently are those of Richard C. Theuer in U.S. Pat. No. 4,282,265, issued on Aug. 4, 1981, and Arthur W. T. Rule in U.S. Pat. No. 4,614,663, issued on Sept. 30, 1986, and U.S. Pat. No. 4,721,626 issued on Jan. 26, 1988. Both of these fat compositions are also particularly for use in infant nutritional products.

The all vegetable oil fat compositions disclosed by Theuer have the following components, wherein percentages are calculated on a weight percentage basis of the fat composition:
 (a) 20-50% of a palmitic acid oil selected from palm oil,
 (b) 10-45% of a lauric acid oil selected from coconut oil, babassu oil, and palm kernal oil,
 (c) 10-25% of an oliec acid oil selected from oleic oil or olive oil,
 (d) 0-20% of a linoleic acid oil selected from corn oil, soybean oil, safflower, and sunflower oil,
the amounts of such oils selected being such that the fat composition contains, per 100 parts by weight of fatty acids present as triglycerides,
 (i) 18 to 28 parts of palmitic acid
 (ii) 28 to 46 parts of oleic acid
 (iii) 6 to 16 parts of linoleic acid, and
 (iv) the aggregate of palmitic acid and oleic acid exceeds 50 parts.
Theuer does not show the range of stearic acid in such fat compositions and does not give any absorption data for his disclosed all vegetable oil fat compositions.

The all vegetable oil fat compositions disclosed by Rule have the following components, wherein percentages are calculated on a weight percentage basis of the fat composition:
 (a) 25-35% of a palmitic acid oil selected from palm oil,
 (b) 27-30% of a lauric acid oil selected from coconut oil, babassu oil, and palm kernel oil,
 (c) 13-25% of an oleic acid oil selected from olive oil and oleic oil, and
 (d) 22% of an linoleic acid oil selected from soybean oil, corn oil, safflower oil, sunflower oil or cottonseed oil, or 22% of sunflower oil plus 2% of safflower oil, the amounts of the oil (and 0-2% lecithin) being such that, per 100 parts by weight of fatty acids, the fatty acid composition is:
 (i) 18 to 26, preferably 18 to 24, advantageously 18 to 22 parts by weight of the sum of palmitic and stearic acids,
 (ii) 7 to 25, preferably 15 to 22, parts by weight of the sum of lauric and myristic acids,
 (iii) 28 to 44, preferably 30 to 36, parts by weight of oleic acid, and
 (iv) 17 to 22, preferably 18 to 20 parts by weight of linoleic acid.

DETAILED DESCRIPTION OF THE INVENTION

The novel all vegetable oil fat compositions of the invention utilize randomized palm oil or randomized palm olein oil as the sole palmitic acid oil source, combined with one or more lauric acid oils, one or more oleic acid oils, and one or more linoleic acid oils. Additionally, the novel fat compositions of the invention have a higher oleic acid oil content than either the Theuer or Rule fat compositions. The inclusion of canola oil (low erucic acid rapeseed or LEAR oil) and sunflower oleic oil as oleic acid oils is a further novel feature of the fat compositions of the invention.

The fat compositions of the invention are as well absorbed as the fat of human milk and have a significantly greater portion of their palmitic acid in the 2 position of the triglyceride, as in human milk, than such prior all vegetable oil fat compositions. In addition to improving the positional distribution of palmitic acid, the fat compositions of the invention have a fatty acid profile which simulates that of human milk, with the lauric acid and palmitic acid levels adjusted to provide maximum absorption.

In a second aspect, the invention includes all vegetable oil fat compositions particularly for use in infant formulas for preterm (or low birth weight) infants. The preterm fat compositions of the invention include medium-chain triglycerides (MCTs) with a randomized palmitic acid oil, a lauric acid oil, an oleic acid oil and a linoleic acid oil.

In its first aspect, this invention comprises an all vegetable oil fat composition particularly for use in a nutritionally complete infant formula, said fat composition comprising
 (a) 20-35%, calculated on the weight of the fat composition, of one or two palmitic acid oils selected from randomized palm oil or randomized palm olein oil;
 (b) 25-31%, calculated on the weight of the fat composition, of one or more lauric acid oils selected from coconut oil, babassu oil and palm kernel oil;
 (c) 28-35%, calculated on the weight of the fat composition, of one or more oleic acid oils selected from olive oil, safflower oleic oil, sunflower oleic oil, and canola oil; and
 (d) 8-17%, calculated on the weight of the fat composition, of one or more linoleic acid oils selected from corn oil, cottonseed oil, safflower oil, soybean oil, and sunflower oil,
the amounts of the oils being such that the fat composition contains, per 100 parts by weight of total fatty acids present as triglycerides,
 (i) 10-18 parts of lauric acid;

(ii) 13–24 parts of palmitic acid;
(iii) 2–5 parts of stearic acid;
(iv) 30–45 parts of oleic acid; and
(v) 11–24 parts of linoleic acid.

In the fat compositions of the invention the saturated fatty acids represent 36–48%, and preferably 40–46%, by weight of the total fatty acids.

Preferred fat compositions of the invention comprise
(a) 22–28% of a randomized palmitic acid oil selected from randomized palm oil or randomized palm olein oil;
(b) 25–31% of a lauric acid oil selected from coconut oil, babassu oil, and palm kernel oil;
(c) 32–35% of an oleic acid oil selected from safflower oleic oil, sunflower oleic oil, and canola oil; and
(d) 11–15% of one or two linoleic acid oils selected from corn oil, safflower oil, soybean oil and sunflower oil.

Also preferred are those fat compositions which include only one linoleic acid oil.

The preferred randomized palmitic acid oil is randomized palm olein oil. The preferred lauric acid oil is coconut oil. The preferred oleic acid oil is safflower oleic oil. The preferred linoleic acid oils are soybean oil and corn oil, or which soybean oil is particularly preferred. Preferred fat compositions of the invention comprise, by total weight of fatty acids present as triglycerides,
(i) 13–17 parts of lauric acid,
(ii) 14–21 parts of palmitic acid,
(iii) 2–4 parts of stearic acid,
(iv) 35–43 parts of oleic acid, and
(v) 12–17 parts of linoleic acid.

Particularly preferred fat compositions of the invention comprise
(a) 22–28% of a randomized palmitic acid oil selected from randomized palm oil or randomized palm olein oil;
(b) 25–31% of a lauric acid oil which is coconut oil;
(c) 32–35% of an oleic acid oil selected from safflower oleic oil, sunflower oleic oil, and canola oil; and
(d) 11–15% of a linoleic acid oil selected from corn oil, safflower oil, soybean oil and sunflower oil,
the amounts of the oils being such that the fat composition contains, per 100 parts by weight of total fatty acids present as triglycerides,
(i) 13–17 parts of lauric acid;
(ii) 14–21 parts of palmitic acid;
(iii) 2–4 parts of stearic acid;
(iv) 35–43 parts of oleic acid; and
(v) 12–17 parts of linoleic acid.

An especially preferred fat composition of the invention comprises
(a) 25% randomized palm olein oil;
(b) 28% coconut oil;
(c) 33% safflower oleic oil; and
(d) 14% soybean oil,
the amounts of the oils being such that the fat compositions contain, per 100 parts by weight of total fatty acids present as triglycerides,
(i) 16 parts of lauric acid;
(ii) 15 parts of palmitic acid;
(iii) 3 parts of stearic acid;
(iv) 41 parts of oleic acid; and
(v) 15 parts of linoleic acid.

In its second aspect, the invention comprises an all vegetable oil fat composition particularly for use in a nutritionally complete infant formula for preterm (or low birth weight) infants, said preterm fat composition comprising (a) 10–30%, calculated on the weight of the fat composition, of one or two palmitic acid oils selected from randomized palm oil or randomized palm oleic oil;
(b) 8–30%, calculated on the weight of the fat composition, of one or more lauric acid oils selected from coconut oil, babassu oil and palm kernel oil;
(c) 8–30%, calculated on the weight of the fat composition, of one or more oleic acid oils selected from olive oil, safflower oleic oil, sunflower oleic oil, and canola oil;
(d) 10–25%, calculated on the weight of the fat composition, of one or more linoleic acid oils selected from corn oil, cottonseed oil, safflower oil, soybean oil, and sunflower oil; and
(e) 10–50%, calculated on the weight of the fat composition, of medium-chain triglycerides (MCTs),
the amount of the oils being such that the fat composition contains, per 100 parts by weight of total fatty acids present as triglycerides,
(i) 8–34 parts of caprylic acid;
(ii) 4–16 parts of capric acid;
(iii) 7–16 parts of palmitic acid;
(iv) 19–35 parts of oleic acid; and
(v) 9–18 parts of linoleic acid.

The medium-chain triglycerides (MCTs) used in the invention are made up of a mixture of C6 (1 to 2%), C8 (65 to 75%), C10 (25 to 35%) and C12 (1 to 2%) medium-chain fatty acids. These MCTs are made by hydrolysis of coconut oil, followed by fractionation of the fatty acids. The first fraction (C6-C12) is then esterified with glycerol, with or without a catalyst. See, for example, V. K. Babayan, "Medium-chain triglycerides—their composition, preparation, and application", Journal of the American Oil Chemists' Society, 45, 23–5 (1968). Other nutritionally acceptable MCTs from other sources may be used in the practice of the invention. MCTs having predominantly C8 and C10 are preferred.

Preferred preterm fat compositions of the invention comprise
(a) 15–25% of a randomized palmitic acid oil selected from randomized palm oil or randomized palm olein oil;
(b) 20–30% of a lauric acid oil selected from coconut oil, babassu oil and palm kernel oil;
(c) 20–30% of an oleic acid oil selected from safflower oleic oil, sunflower oleic oil, and canola oil;
(d) 14–21% of one or two linoleic acid oils selected from corn oil, safflower oil, soybean oil and sunflower oil; and
(e) 10–25% of medium-chain triglycerides (MCTs).

Also preferred are those preterm fat compositions which include only one linoleic acid oil.

The preferred randomized palmitic acid oil is randomized palm olein oil. The preferred lauric acid oil is coconut oil. The preferred oleic acid oil is safflower oleic oil. The preferred linoleic acid oils are soybean oil and corn oil, of which soybean oil is particularly preferred. The preferred medium-chain triglycerides (MCTs) comprise 60–70% caprylic acid (C8) and 25–35% capric acid (C10).

Preferred fat compositions of the invention comprise, by total weight of fatty acids present as triglycerides,
(a) 8–18 parts of caprylic acid,
(b) 4–9 parts of capric acid,
(c) 10–14 parts of palmitic acid,
(d) 25–35 parts of oleic acid, and
(e) 12–17 parts of linoleic acid.

Lauric acid is present in 5–17 parts, and preferrably 12–17 parts.

Particularly preferred preterm fat compositions of the invention comprise (a) 15–25% of a randomized palmitic acid oil selected from randomized palm oil or randomized palm olein oil;

(b) 20–30% of a lauric acid oil which is coconut oil;

(c) 20–30% of an oleic acid oil selected from safflower oleic oil, sunflower oleic oil, and canola oil;

(d) 14–21% of a linoleic acid oil selected from corn oil, safflower oil, soybean oil and sunflower oil, and (e) 10–25% of medium-chain triglycerides (MCTs), the amounts of the oils being such that the fat composition contains, per 100 parts by weight of total fatty acids present as triglycerides, (i) 8–18 parts of caprylic acid;
(ii) 4–9 parts of capric acid;
(iii) 10–14 parts of palmitic acid;
(iv) 25–35 parts of oleic acid; and
(v) 12–17 parts of linoleic acid.

An especially preferred fat composition of the invention comprises (a) 20% randomized palm olein oil;
(b) 27% coconut oil;
(c) 25% safflower oleic oil;
(d) 18% soybean oil; and
(e) 10% medium-chain triglycerides (MCTs), the amounts of the oils being such that the fat compositions contain, per 100 parts by weight of total fatty acids present as triglycerides, (i) 8–9 parts of caprylic acid;
(ii) 4–5 parts of capric acid;
(iii) 12–13 parts of palmitic acid;
(iv) 33–34 parts of oleic acid; and
(v) 15–16 parts of linoleic acid.

Randomized palm oil and randomized palm olien oil differ chemically and nutritionally from native palm oil and native palm olein oil. In native fats and oils, the various fatty acids are positioned, i.e. esterified, on one of the three hydroxy groups of the glycerol molecule in an ordered pattern that is characteristic of the particular fat or oil. In general, the long chain saturated fatty acids, C16–C18, are predominantly on the 1 and 3 position, the mono and polyunsaturated fatty acids on the 2 or middle position of the triglyceride molecule. A second distribution of the fatty acids on the glycerol backbone that exists in nature results in a very large percentage of the triglycerides being so-called mixed triglycerides, i.e. each of the three fatty acids, or at least two, are different. There is only a small amount of simple triglycerides, those in which the three hydroxy groups are esterified with the same fatty acid, e.g., tripalmitin (C16), triolein (C18), etc.

Interesterification, also called randomization (since it alters the non-random distribution of nature), is accomplished by heating the fat or oil for a short period of time, usually with a catalyst such as sodium methylate. The fatty acids leave their natural position on the triglyceride and rearrange in a random fashion, i.e., equally on each of the three position. Thus, one-third of each individual fatty acid is on the one position, one-third on the two, and one-third on the three position of the triglycerides. Interesterification also results in an increase in the content of simple triglycerides. For example, in an oil rich in lauric acid (C12), after randomization there would be an increase in the amount of trilaurin. Randomization of native palmitic acid oils may be accomplished by heating from 0.5 to 4 hours, preferrably 0.5 to 2 hours, at temperatures from 100°–140° C., preferably 110°–130° C., with 0.05–0.50 percent, preferably 0.05–0.15 percent, sodium methylate present. The endpoint of the randomization process should provide palmitic acid at least 27%, and preferably 33%, in the 2 position of the triglycerides.

Thus, the resulting randomized palm oil is not the same chemical entity as the untreated native palm oil. Native palm oil is a collection of triglycerides of defined structures. Randomized palm oil is a collection of triglycerides of entirely different chemical structures. The physical properties are different. For example, randomization generally results in an increase in the melting point.

The fatty acid composition of a native palm and palm olein oil and of the same two oils after interesterification treatment is presented in Table I. The alteration in the positional distribution of the fatty acids is indicated by the change in the proportion of the fatty acids in the 2-position. Only five of the major fatty acids are included in this table, and the percentages therefore do not add up to 100 percent. After randomization, theoretically one-third of the fatty acid should be in the 2-position. In practice, however, not all of the fatty acids are randomized equally or completely under the specific randomization conditions employed or at the determined endpoint of the run.

TABLE I

Effect of Randomization On the Positional Distribution Of the Fatty Acids

|  | Native Palm Oil | Randomized Palm Oil | Native Palm Olein | Randomized Palm Olein |
|---|---|---|---|---|
| C14 | 1.72* (22)** | 1.50 (37) | 1.3 (20.0) | 1.3 (33.3) |
| C16 | 43.91 (17) | 42.14 (35) | 40.4 (13.4) | 39.8 (32.9) |
| C18 | 4.24 (21) | 4.49 (39) | 4.1 (19.7) | 4.1 (40.2) |
| C18:1 | 38.42 (48) | 40.29 (31) | 41.8 (47.3) | 41.8 (30.7) |
| C18:2 | 9.61 (59) | 9.90 (32) | 9.6 (56.5) | 9.5 (30.8) |

*percent of total fatty acids
**percent in the 2-position

The effect of randomization on the degree of alteration of the melting point depends on the particular oil. The greatest change observed has been with a sample of palm olein oil (soft palm oil), which had a melting point of 15° C. before randomization and 39.5° C. after randomization, a marked demonstration of the change in chemical composition. The native palm olein oil of the above example had a melting point of <23° C., whereas the resulting randomized palm olein oil had a melting point of 45° C.

Native palm oil or palm olein oil and randomized palm oil or palm olein oil also differ importantly in their biochemical properties. This difference is particularly significant for use in infant nutritional products.

In the digestion of triglycerides in the intestine, pancreatic lipase hydrolyzes the fatty acids at the 1 and 3 position, resulting in two free fatty acids and a 2-monoglyceride containing the fatty acid of the glyceride 2 position.

A long chain saturated fatty acid is less well absorbed as a free fatty acid than if it is present in the gut as a monoglyceride.

Palmitic acid is the major saturated fatty acid of human milk triglycerides. It is a long chain, C16, fatty acid. Long chain fatty acids are not as well absorbed as short chain or unsaturated fatty acids, yet the palmitic acid of human milk is well absorbed because the palmitic acid of human milk is predominantly in the 2 position, and, after intestinal digestion, the majority of the palmitic acid is present in the intestine as the more readily absorbed 2monopalmitin.

As seen above, randomized palm and palm olein oil have double the amount of palmitic acid in the 2 position of the triglyceride as do native palm and palm olein oil. Accordingly, the nutritional value of the fat compositions of the invention is significantly improved with respect to the prior all vegetable oil fat compositions, which use only the native palmitic acid oils.

The present invention also provides a nutritionally complete food product adapted for human infant nutrition containing the fat compositions according to the invention, as fully described above. Such food product comprises the fat composition, a protein source, a cabohydrate source, and appropriate levels of vitamins, minerals and other nutritional factors. The product may be a ready-to-feed liquid or in the form of a powder or concentrated liquid adapted to provide a ready-to-feed form by the addition of water and stirring. The product preferably contains 2.2 to 4.0 g, advantageously about 3.6 g of a fat composition of the invention; 1.2 to 3.0 g, advantageously about 1.5 g of protein; and 6 to 9 g carbohydrate-per 100 ml of the ready-to-feed liquid formula supplying preferably 60-75 kcal per 100 ml.

As protein sources there may be mentioned casein, salts of casein (e.g. potassium caseinate), whey protein concentrate, soybean protein isolate, cow's milk protein, or hydrolyzed whey or casein protein. Cow's milk protein differs from that of human milk in the proportions present as casein and whey protein. Cow's milk has about 80% casein and 20% whey proteins, whereas human milk has about 40% casein and about 60% whey proteins. Accordingly, the protein used may be adapted to simulate that of human milk by supplementing cow's milk protein with an appropriate amount of whey protein. Because whey contains a very high proportion of the minerals of milk, the whey is subjected to demineralisation, in particular by electrodialysis or ultrafiltration, to prepare whey protein. Where a milk-free diet for infants who are intolerant of cow's milk protein is desired, the protein source may be isolate soy protein or hydrolyzed casein or whey protein. The proteins may be used in combination.

As a carbohydrate source lactose is generally preferred in formulas for normal, healthy infants. However, lactose would be contraindicated for infants suffering from galactosemia, lactose intolerance, or cow's milk protein intolerance. (In the latter case, the lactose may contain cow's milk protein.) Where a milk-free diet is desired, the carbohydrate source may be sucrose, corn syrup solids (glucose polymers), or a combination of corn syrup solids with sucrose. The carbohydrates may also be used in combination.

Additionally, the food product (infant formula) would contain nutritionally acceptable quantities of the following minerals and vitamins calcium, phosphorus, potassium, sodium, chloride, magnesium, iron, copper, zinc, manganese, iodine and selenium; and vitamin A, vitamin D, vitamin E, vitamin $K_1$, vitamin $B_1$, vitamin $B_2$, vitamin $B_6$, vitamin $B_{12}$, vitamin C, pantothenic acid, niacin, folic acid, biotin, choline and inositol. The food product could contain other nutritional factors, such as taurine, carnitine, nucleotides, and a source of long chain polyunsaturated fatty acids.

The invention includes a process for the preparation of the fat composition by blending the components (a), (b), (c), and (d) and (e) for the preterm fat composition) together in such proportions that the resultant composition has the required composition of fatty acids. Additionally, an emulsifying agent such as lecithin or diglycerides, in an amount up to 2 percent of the total weight of the fat composition, may be blended into the fat mixture. Soybean lecithin concentrate is commonly used, and since the concentrate contains essentially the same amount of fatty acids as in soybean oil, in the examples of fat blends presented below, 1 percent of soybean lecithin concentrate is included in the listed amounts of soybean oil. The proportions of the oils to be used can be calculated from the fatty acid profiles of the individual oil components. The blending is preferably performed at a blending temperature above the melting point of the fat mixture, whereby each component oil is in the liquid phase. The heating of the oils to the blending temperature and the mixing of the oils in a conventional mixing apparatus should be carried out with careful temperature control. A blending temperature within the range of about 36° C. to 50° C. may be used. Oil soluble vitamins are normally dissolved in the fat composition as a preliminary step.

To prepare the nutritionally complete food product, the completed fat mixture is mixed with the other components which have been separately combined. Processing to a final ready-to-feed liquid, concentrated liquid or powder may be carried out in a conventional manner.

Table II presents a comparison of the fatty acid composition of human milk fat and of three fat blends of the invention, utilizing only the four preferred fat ingredients: A the preferred, fat blend; B, a low randomized palm olein fat blend; and C a high randomized palm olein. A separate subtotal is given for each column for the listed saturated and unsaturated fatty acids. In Table I, the fatty acid totals do not add up to 100% because only the major fatty acids are included. The fatty acid percentage values used in the description of the fat compositions of the invention are arrived at in a similar manner.

TABLE II

Randomized Palm Olien Oil Fat Blands and Fatty Acid Composition

| | A Preferred | B Low Rand. Palm Olein | C High Rand. Palm Olein | Human Milk* |
|---|---|---|---|---|
| Oils | | | | |
| Randomized palm olein oil (palmitic) | 25 | 20 | 35 | |
| Coconut oil (lauric) | 28 | 28 | 28 | |
| Safflower oleic oil (oleic) | 33 | 35 | 28 | |
| Soybean oil (linoleic) | 14 | 17 | 9 | |
| Fatty acids | | | | |
| C8 - Caprylic | 2.0 | 2.0 | 2.0 | 0.0 |
| C10 - Capric | 1.5 | 1.4 | 1.5 | 1.2 |
| C12 - Lauric | 15.6 | 15.5 | 15.8 | 4.8 |
| C14 - Myristic | 5.4 | 5.3 | 5.6 | 6.4 |
| C16 - Palmitic | 14.7 | 13.1 | 17.8 | 23.1 |
| C18 - Stearic | 2.8 | 2.7 | 3.0 | 8.2 |
| Saturated Sub total | 42.0 | 10.0 | 45.7 | 43.7 |
| C16:1 - Palmitoleic | 0.1 | 0.1 | 0.1 | 1.2 |
| C18:1 - Oleic | 40.8 | 41.0 | 39.0 | 36.6 |
| C18:2 - Linoleic | 15.2 | 16.7 | 12.6 | 12.5 |
| C18:3 - Linolenic | 0.9 | 0.9 | 1.0 | 1.2 |
| Unsaturated Sub total | 57.0 | 58.7 | 52.7 | 51.5 |
| Total | 99.0 | 98.7 | 98.4 | 95.2 |

*Composite values from 11 published reports from the U.S., Great Britain, Canada, West Germany, Australia and Finland from 1965-1983.

The fatty acid content of human milk is not a set constant, but varies depending largely upon the local diet and somewhat on the stage of lactation. Thus, the range of variance of the fatty acid content of human milk of the eleven studies from which the composite figures of Table II were obtained is given in Table III below.

TABLE III

Human Milk Fatty Acid Range

| Fatty Acid | | Range Reported |
|---|---|---|
| C8 | Caprylic | 0.1 |
| C10 | Capric | 0.8–1.6 |
| C12 | Lauric | 3.1–6.3 |
| C14 | Myristic | 5.1–7.4 |
| C16 | Palmitic | 20.2–25.2 |
| C18 | Stearic | 5.5–10.4 |
| C16:1 | Palmitoleic | 3.7–4.1 |
| C18:1 | Oleic | 29.4–46.9 |
| C18:2 | Linoleic | 7.2–15.6 |
| C18:3 | Linolenic | 0.7–2.0 |

Further variances from these ranges will be found in other geographic areas, for example, where the diet is largely vegetarian or where fish or other seafoods are a major food source.

Table IV below gives either further examples (D-K) of randomized palmatic acid oil fat blends of the invention. These examples represent the low and high values for lauric, palmitic, linoleic and linolenic acids utilizing the vegetable oil in each group having the lowest and highest content, respectively, of each of these four fatty acids.

TABLE IV

Low/High Randomized Palm Oil Fat Blends

| | Range | D | E | F | G |
|---|---|---|---|---|---|
| coconut | 25–31 | — | 31 | 31 | — |
| babassu | | 25 | — | — | — |
| palm kernel | | — | — | — | 25 |
| rand palm | 20–35 | — | — | — | 35 |
| rand palm olein | | 23 | 20 | 20 | — |
| safflower oleic | 28–35 | — | 34 | 35 | — |
| olive | | 35 | — | — | 28 |
| canola | | — | — | — | — |
| corn | | — | — | — | — |
| soy | | — | 15 | — | — |
| sunflower | 8–17 | 17 | — | — | — |
| safflower | | — | — | 14 | — |
| cottonseed | | — | — | — | 12 |
| lauric C12 | | 11.7 | 17.2 | 17.1 | 12.7 |
| myristic C14 | | 4.7 | 5.8 | 5.8 | 5.1 |
| palmitic C16 | | 18.2 | 13.1 | 13.0 | 24.1 |
| stearic C18 | | 4.0 | 2.7 | 2.6 | 3.3 |
| Unsaturated total* | | 41.7 | 42.6 | 42.4 | 46.4 |
| palmoleic C16:1 | | 0.7 | 0.1 | — | 0.5 |
| oleic C18:1 | | 39.6 | 39.9 | 38.8 | 38.0 |
| linoleic C18:2 | | 16.7 | 15.4 | 17.7 | 14.5 |
| linolenic C18:3 | | 0.6 | 0.9 | 0.1 | 0.2 |
| Saturated total* | | 57.7 | 56.2 | 56.6 | 53.2 |
| | Range | H | I | J | K |
| coconut | 25–31 | 31 | — | — | — |
| babassu | | — | — | 31 | — |
| palm kernel | | — | — | — | 25 |
| rand palm | 20–35 | 20 | — | 35 | — |
| rand palm olein | | — | 23 | — | 23 |
| safflower oleic | 28–35 | — | 35 | — | — |
| olive | | — | — | 26 | — |
| canola | | 32 | — | — | 35 |
| corn | | — | 17 | — | — |
| soy | | — | — | — | — |
| sunflower | 8–17 | — | — | — | — |
| safflower | | 17 | — | — | 17 |
| cottonseed | | — | — | 8 | — |
| lauric C12 | | 16.7 | 11.8 | 14.0 | 13.2 |
| myristic C14 | | 5.7 | 4.8 | 5.9 | 5.0 |
| palmitic C16 | | 13.8 | 14.1 | 23.1 | 14.4 |
| stearic C18 | | 2.9 | 3.0 | 4.0 | 2.7 |
| Unsaturated total* | | 42.8 | 36.8 | 50.7 | 36.4 |
| palmoleic C16:1 | | — | 0.1 | 0.5 | — |
| oleic C18:1 | | 30.6 | 44.7 | 36.5 | 35.7 |
| linoleic C18:2 | | 22.8 | 17.4 | 11.8 | 23.9 |
| linolenic C18:3 | | 2.6 | 0.2 | 0.2 | 0.6 |
| Saturated total* | | 56.6 | 62.6 | 49.2 | 63.1 |

*In addition to those fatty acids listed, the totals include other fatty acids present in smaller percentages.

Table V below gives seven further examples (L-R) of randomized palmitic acid oil fat blends of the invention. These examples utilize the different vegetable oils in each group in the preferred amount for that particular group.

TABLE V

Fatty Acid Composition Of Blends of the Preferred Amounts of Each Class of Oil

| | L | M | N | O | P | Q | R |
|---|---|---|---|---|---|---|---|
| coconut | — | 28 | — | 28 | 28 | — | — |
| babassu | 28 | — | — | — | — | 28 | — |
| palm kernel | — | — | 28 | — | — | — | 28 |
| rand palm | — | — | 25 | — | — | 25 | — |
| rand palm olein | 25 | 25 | — | 25 | 25 | — | 25 |
| safflower oleic | 33 | — | — | 33 | — | — | — |
| olive | — | — | 33 | — | — | 33 | — |
| canola | — | — | — | — | 33 | — | 33 |
| sunflower oleic | — | 33 | — | — | — | — | — |
| corn | — | — | — | 14 | — | — | — |
| soy | 14 | — | — | — | — | — | — |
| sunflower | — | 14 | — | — | — | — | — |
| safflower | — | — | — | — | 14 | — | 14 |
| cottonseed | — | — | 14 | — | — | 14 | — |
| lauric C12 | 13.2 | 15.5 | 14.3 | 15.6 | 15.5 | 12.6 | 14.7 |
| myristic C14 | 5.4 | 5.3 | 5.5 | 5.4 | 5.3 | 5.3 | 5.6 |
| palmitic C16 | 14.7 | 14.3 | 21.5 | 14.7 | 14.6 | 21.1 | 15.0 |
| stearic C18 | 3.4 | 2.7 | 3.0 | 2.6 | 2.8 | 3.6 | 2.7 |
| Unsaturated total* | 40.1 | 42.8 | 45.5 | 41.7 | 41.7 | 46.0 | 39.4 |
| palmoleic C16:1 | 0.1 | 0.1 | 0.6 | 0.1 | 0.1 | 0.6 | 0.1 |
| oleic C10:1 | 43.1 | 39.1 | 38.0 | 41.2 | 32.9 | 37.8 | 35.4 |
| linoleic C18:2 | 15.2 | 17.9 | 15.2 | 15.6 | 21.1 | 14.9 | 21.4 |
| linolenic C18:23 | 0.9 | 0.1 | 0.2 | 0.2 | 0.5 | 0.2 | 2.7 |
| Saturated total* | 59.5 | 56.2 | 53.9 | 57.0 | 57.3 | 53.3 | 60.1 |

*In addition to those fatty acids listed, the totals include other fatty acids present in smaller percentages.

In Table VI below are examples of preterm fat blend compositions of the invention. These examples use the preferred MCTs and the preferred randomized palmitic acid oil, lauric acid oil, oleic acid oil and linoleic acid oil. The asterisk at fat blend X indicates that this is the particularly preferred preterm fat blend composition.

TABLE VI

Randomized Palm Olein Oil Preterm Fat Blends, and Fatty Acid Composition

| | S | T | U | V | W | X* | Y |
|---|---|---|---|---|---|---|---|
| MCTs | 10 | 10 | 50 | 50 | 20 | 10* | 30 |
| RPOO** | 10 | 30 | 10 | 24 | 20 | 20 | 15 |
| COCO | 30 | 21 | 12 | 8 | 25 | 27 | 20 |
| S-Oleic | 25 | 21 | 15 | 8 | 20 | 25 | 20 |
| Soy | 25 | 18 | 13 | 10 | 15 | 18 | 15 |
| C8 | 8.7 | 8.1 | 33.7 | 33.5 | 14.9 | 8.5 | 21.1 |
| C10 | 4.6 | 4.2 | 16.0 | 15.8 | 7.4 | 4.5 | 10.3 |
| C12 | 16.6 | 12.1 | 7.4 | 5.5 | 14.2 | 15.1 | 11.6 |
| C14 | 5.5 | 4.2 | 2.3 | 1.8 | 4.8 | 5.1 | 3.8 |
| C16 | 9.6 | 15.8 | 6.7 | 11.1 | 11.9 | 12.6 | 9.6 |
| C18 | 2.4 | 2.8 | 1.4 | 1.7 | 2.3 | 2.5 | 2.0 |
| C18:1 | 31.3 | 34.3 | 19.6 | 19.1 | 28.8 | 33.5 | 26.5 |
| C18:2 | 18.7 | 16.1 | 10.5 | 9.1 | 13.3 | 15.7 | 12.8 |
| C18:3 | 1.5 | 1.1 | 0.8 | 0.6 | 0.9 | 1.1 | 0.9 |

*preferred
**randomized palm olein oil

EXAMPLE 1

Given below are two examples of the composition of a complete infant nutritional product using a fat blend composition of the invention. In the examples, the preferred fat blend composition is used, but any randomized palmitic acid oil fat blend composition of the invention may be used. ("RPOO" below stands for randomized palm olein oil.)

|  | 1A | 1B |
|---|---|---|
| Protein | non-fat milk and demineralized whey | soy protein isolate |
| Fat (oils) | RPOO - 25% | RPOO - 25% |
|  | Coconut - 28% | Coconut - 28% |
|  | Oleic 33% | Oleic - 33% |
|  | Soybean - 13% | Soybean - 13% |
|  | Lecithin - 1% | Lecithin - 1% |
| Carbohydrate | lactose | sucrose |
| Constituents | per liter | per liter |
| Energy kcal | 676 | 676 |
| Protein g | 15 | 21 |
| Fat g | 36 | 36 |
| Carbohydrate g | 72 | 69 |
| Water g | 904 | 898 |
| Linoleic Acid mg | 3300 | 3300 |
| Vitamin A IU | 2000 | 2000 |
| Vitamin D IU | 400 | 400 |
| Vitamin E IU | 9.5 | 9.5 |
| Vitamin K mcg | 55 | 100 |
| Thiamin (Vit B1) mcg | 670 | 670 |
| Riboflavin (Vit B2) mcg | 1000 | 1000 |
| Vitamin B6 mcg | 420 | 420 |
| Vitamin B12 mcg | 1.3 | 2 |
| Niacin mcg | 5000 | 5000 |
| Folic Acid (Folacin) mcg | 50 | 50 |
| Pantothenic Acid mcg | 2100 | 3000 |
| Biotin mcg | 15 | 35 |
| Vit C (Ascorbic Acid) mg | 55 | 55 |
| Choline mg | 100 | 85 |
| Inositol mg | 32 | 27 |
| Taurine mg | 40 | 40 |
| Carnitine mg | 37 | 8.5 |
| Calcium mg | 420 | 600 |
| Phosphorus mg | 280 | 420 |
| Magnesium mg | 45 | 67 |
| Iron mg (w/wo) | 12.0/1.5 | 11.5 |
| Zinc mg | 5 | 5 |
| Manganese mcg | 150 | 200 |
| Copper mcg | 470 | 470 |
| Iodine mcg | 60 | 60 |
| Sodium mg | 150 | 200 |
| Potassium mg | 560 | 700 |
| Chloride mg | 375 | 375 |

EXAMPLE 2

Given below are two examples of the composition of a complete preterm infant nutritional product using a preterm fat blend composition according to the invention. In the examples the preferred preterm fat blend is used, but any randomized palmitic acid oil fat blend of the invention may be used. ("RPOO" below stands for randomized palm olein oil and MCT stands for medium chain triglycerides.)

EXAMPLE 2

|  | 2A | 2B |
|---|---|---|
| Protein | Non-fat milk and demineralized whey | Non-fat milk and demineralized whey |
| Fat (oils) | MCT - 10% | MCT - 10% |
|  | RPOO - 10% | RPOO - 20% |
|  | Coconut - 27% | Coconut - 27% |
|  | S. Oleic - 25% | S. Oleic - 25% |

EXAMPLE 2-continued

|  | 2A | 2B |
|---|---|---|
|  | Soybean - 17% | Soybean - 17% |
|  | Lecithin - 1% | Lecithin - 1% |
| Constituents | per liter | per liter |
| Energy kcal | 810 | 810 |
| Protein g | 20 | 22.0 |
| Fat g | 44 | 42.1 |
| Carbohydrate g | 86 | 86.5 |
| Water g | 880 | 800 |
| Linoleic Acid mg | 4000 | 4050 |
| Vitamin A IU | 2400 | 8100 |
| Vitamin D IU | 480 | 2430 |
| Vitamin E IU | 15 | 36.5 |
| Vitamin K mcg | 70 | 105 |
| Thiamin (Vit B1) mcg | 800 | 2025 |
| Riboflavin (Vit B2) mcg | 1300 | 2835 |
| Vitamin B6 mcg | 500 | 2025 |
| Vitamin B12 mcg | 2 | 3.2 |
| Niacin mcg | 6300 | 36450 |
| Folic Acid (Folacin) mcg | 100 | 284 |
| Pantothenic Acid mcg | 3600 | 12150 |
| Biotin mcg | 18 | 16.2 |
| Vit C (Ascorbic Acid) mg | 70 | 284 |
| Choline mg | 127 | 64.8 |
| Inositol mg | 32 | 200 |
| Taurine mg | 48 | 48 |
| Calcium mg | 750 | 1000 |
| Phosphorus mg | 400 | 600 |
| Magnesium mg | 70 | 81 |
| Iron mg | 3 | 2.4 |
| Zinc mg | 8 | 10.5 |
| Manganese mcg | 200 | 105 |
| Copper mcg | 700 | 1417.5 |
| Iodine mcg | 83 | 81 |
| Sodium mg | 320 | 405 |
| Potassium mg | 750 | 972 |
| Chloride mg | 530 | 729 |

What is claimed is:

1. An all vegetable oil fat composition particularly for use in a nutritionally complete infant formula, said all vegetable oil fat composition comprising
   (a) 20–35%, calculated on the weight of the fat composition, of one or two randomized palmitic acid oil selected from randomized palm oil or randomized palm olein oil;
   (b) 25–31%, calculated on the weight of the fat composition, of one or more lauric acid oils selected from coconut oil, babassu oil and palm kernel oil;
   (c) 28–35%, calculated on the weight of the fat composition, of one or more oleic acid oils selected from olive oil, safflower oleic oil, sunflower oleic oil, and canola oil; and
   (d) 8–17%, calculated on the weight of the fat composition of one or more linoleic acid oils selected from corn oil, cottonseed oil, safflower oil, soybean oil, and sunflower oil,
the amounts of the oils being such that the fat composition contains, per 100 parts by weight of total fatty acids present as triglycerides,
   (i) 10–18 parts of lauric acid;
   (ii) 13–24 parts of palmitic acid;
   (iii) 2–5 parts of stearic acid;
   (iv) 30–45 parts of oleic acid; and
   (v) 11–24 parts of linoleic acid.

2. An all vegetable oil fat composition according to claim 1 containing one palmitic acid oil, one lauric acid oil, one oleic acid oil, and one or two linoleic acid oils.

3. An all vegetable oil fat composition according to claim 2 containing one linoleic acid oil.

4. An all vegetable oil fat composition according to claim 1 wherein the randomized palmitic acid oil selected is randomized palm olein oil.

5. An all vegetable oil fat composition according to claim 1 wherein the lauric acid oil selected is coconut oil.

6. An all vegetable oil fat composition according to claim 1 wherein the oleic acid oil selected is safflower oleic oil.

7. An all vegetable oil fat composition according to claim 1 wherein one or two linoleic acid oils are selected from soybean oil and corn oil.

8. An all vegetable oil fat composition according to claim 1 wherein one linoleic acid oil is used, which is selected from soybean oil and corn oil.

9. An all vegetable oil fat composition according to claim 1 in which the saturated fatty acids represent 40–46% by weight of the total fatty acids.

10. An all vegetable oil fat composition according to claim 1 wherein the oils comprise
   (a) 22–28% of a randomized palmitic acid oil selected from randomized palm oil or randomized palm olein oil;
   (b) 25–31% of a lauric acid oil selected from coconut oil, babassu oil and palm kernel oil;
   (c) 32–35% of an oleic acid oil selected from safflower oleic oil, sunflower oleic oil, and canola oil; and
   (d) 11–15% of one or two linoleic acid oils selected from corn oil, safflower oil, soybean oil and sunflower oil.

11. An all vegetable oil fat composition according to claim 10 wherein one or two linoleic acid oils are selected from corn oil and soybean oil.

12. An all vegetable oil fat composition according to claim 10 wherein one linoleic acid oil is used, which is selected from soybean oil and corn oil.

13. An all vegetable oil fat composition according to claim 1 wherein the fat composition comprises, by total weight of fatty acids present as triglycerides,
   (i) 13–17 parts of lauric acid,
   (ii) 14–21 parts of palmitic acid,
   (iii) 2–4 parts of stearic acid,
   (iv) 35–43 parts of oleic acid, and
   (v) 12–17 parts of linoleic acid.

14. An all vegetable oil fat composition according to claim 1, which comprises
   (a) 22–28% of a randomized palmitic acid oil selected from randomized palm oil or randomized palm olein oil;
   (b) 25–31% of a lauric acid oil which is coconut oil;
   (c) 32–35% of an oleic acid oil selected from safflower oleic oil, sunflower oleic oil, canola oil; and
   (d) 11–15% of a linoleic acid oil selected from corn oil, safflower oil, soybean oil and sunflower oil,
the amounts of the oils being such that the fat composition contains, per 100 parts by weight of total fatty acids present as triglycerides,
   (i) 13–17 parts of lauric acid;
   (ii) 14–21 parts of palmitic acid;
   (iii) 2–4 parts of stearic acid;
   (iv) 35–43 parts of oleic acid; and
   (v) 12–17 parts of linoleic acid.

15. A nutritionally complete food product adapted for human infant nutrition, comprising a protein source, a carbohydrate source, vitamins, minerals, and an all vegetable oil fat composition of claim 14.

16. An all vegetable oil fat composition according to claim 1, which comprises
   (a) 25% randomized palm olein oil;
   (b) 28% coconut oil;
   (c) 33% safflower oleic oil; and
   (d) 14% soybean oil,
the amounts of the oils being such that the fat compositions contain, per 100 parts by weight of total fatty acids present as triglycerides,
   (i) 16 parts of lauric acid;
   (ii) 15 parts of palmitic acid;
   (iii) 3 parts of stearic acid;
   (iv) 41 parts of oleic acid; and
   (v) 15 parts of linoleic acid.

17. A nutritionally complete food product adapted for human infant nutrition, comprising a protein source, a carbohydrate source, vitamins, minerals, and an all vegetable oil fat composition of claim 1.

18. An all vegetable oil fat composition particularly for use in a nutritionally complete infant formula, said all vegetable oil fat composition comprising
   (a) 22–28% of a randomized palmitic acid oil selected from randomized palm oil or randomized palm olein oil;
   (b) 25–31% of a lauric acid oil selected from coconut oil, babassu oil, and palm kernel oil;
   (c) 32–35% of an oleic acid oil selected from safflower oleic oil, sunflower oleic oil, and canola oil; and
   (d) 11–15% of a linoleic acid oil selected from corn oil, safflower oil, soybean oil and sunflower oil,
the amounts of the oils being such that the fat composition contains, per 100 parts by weight of total fatty acids present as triglycerides,
   (i) 13–17 parts of lauric acid;
   (ii) 14–21 parts of palmitic acid;
   (iii) 2–4 parts of stearic acid;
   (iv) 35–43 parts of oleic acid; and
   (v) 12–17 parts of linoleic acid.

19. An all vegetable oil fat composition according to claim 18 wherein the saturated fatty acids represent 40–46% by weight of the total fatty acids.

20. An all vegetable oil fat composition according to claim 18 wherein the palmitic acid oil selected is randomized palm olein oil.

21. An all vegetable oil fat composition according to claim 18 wherein the lauric acid oil selected is coconut oil.

22. An all vegetable oil fat composition according to claim 18 wherein the oleic acid oil selected is safflower oleic oil.

23. An all vegetable oil fat composition according to claim 18 wherein the linoleic oil selected is soybean oil.

24. An all vegetable oil fat composition according to claim 18 comprising
   (a) 25% randomized palm olein oil;
   (b) 28% coconut oil;
   (c) 33% safflower oleic oil; and
   (d) 14% soybean oil;
the amounts of the oils being such that the fat compositions contain, per 100 parts by weight of total fatty acids present as triglycerides,
   (i) 16 parts lauric acid;
   (ii) 15 parts palmitic acid;
   (iii) 3 parts stearic acid;
   (iv) 41 parts oleic acid; and
   (v) 15 parts linoleic acid.

25. A nutritionally complete food product adapted for human infant nutrition, comprising a protein source, a carbohydrate source, vitamins, minerals, and an all vegetable oil fat composition of claim 18.

26. An all vegetable oil fat composition particularly for use in a nutritionally complete preterm (or low birth weight) infant formula, said preterm, all vegetable oil fat composition comprising
  (a) 10-30%, calculated on the weight of the fat composition, of one or two palmitic acid oils selected from randomized palm oil or randomized palm olein oil;
  (b) 8-30%, calculated on the weight of the fat composition, of one or more lauric acid oils selected from coconut oil, babassu oil and palm kernel oil;
  (c) 8-30%, calculated on the weight of the fat composition, of one or more oleic acid oils selected from olive oil, safflower oleic oil, sunflower oleic oil, and canola oil;
  (d) 10-25%, calculated on the weight of the fat composition of one or more linoleic acid oils selected from corn oil, cottonseed oil, safflower oil, soybean oil, and sunflower oil; and
  (e) 10-50%, calculated on the weight of the fat composition, of medium-chain triglycerides (MCTs).
the amounts of the oils being such that the fat composition contains, per 100 parts by weight of total fatty acids present as triglycerides,
  (i) 8-34 parts of caprylic acid;
  (ii) 4-16 parts of capric acid;
  (iii) 7-16 parts of palmitic acid;
  (iv) 19-35 parts of oleic acid; and
  (v) 9-18 parts of linoleic acid.

27. A preterm, all vegetable oil fat composition according to claim 26 containing one palmitic acid oil, one lauric acid oil, one oleic acid oil, and one or two linoleic acid oils.

28. A preterm, all vegetable oil fat composition according to claim 27 wherein one linoleic acid oil is used.

29. A preterm, all vegetable oil fat composition according to claim 26 wherein the randomized palmitic acid oil selected is randomized palm olein oil.

30. A preterm, all vegetable oil fat composition according to claim 26 wherein the lauric acid oil selected is coconut oil.

31. A preterm, all vegetable oil fat composition according to claim 26 wherein the oleic acid oil selected is safflower oleic oil.

32. A preterm, all vegetable oil fat composition according to claim 26 wherein one or two linoleic acid oils are selected from soybean oil and corn oil.

33. A preterm, all vegetable oil fat composition according to claim 26 wherein one linoleic acid oil is used, which is selected from soybean oil and corn oil.

34. A preterm, all vegetable oil fat composition according to claim 26 wherein the oils comprise
  (a) 15-25% of a randomized palmitic acid oil selected from randomized palm oil or randomized palm olein oil;
  (b) 20-30% of a lauric acid oil selected from coconut oil, babassu oil and palm kernel oil;
  (c) 20-30% of an oleic acid oil selected from safflower oleic oil, sunflower oleic oil, and canola oil;
  (d) 14-21% of one or two linoleic acid oils selected from corn oil, safflower oil, soybean oil and sunflower oil; and
  (e) 10-25% of medium-chain triglycerides (MCTs).

35. A preterm, all vegetable oil fat composition according to claim 34 wherein one or two linoleic acid oils are selected from corn oil and soybean oil.

36. A preterm, all vegetable oil fat composition according to claim 34 wherein one linoleic acid oil is selected, which is soybean oil.

37. A preterm, all vegetable oil fat composition according to claim 34 wherein the medium-chain triglycerides (MCTs) comprise 60-70% caprylic acid and 25-35% capric acid.

38. A preterm, all vegetable oil fat composition according to claim 34 wherein the fat composition comprises, by total weight of fatty acids present as triglycerides,
  (i) 8-18 parts of caprylic acid,
  (ii) 4-9 parts of capric acid,
  (iii) 10-14 parts of palmitic acid,
  (iv) 25-35 parts of oleic acid, and
  (v) 12-17 parts of linoleic acid.

39. A preterm, all vegetable oil fat composition according to claim 34, which comprises
  (a) 15-25% of a randomized palmitic acid oil selected from randomized palm oil or randomized palm olein oil;
  (b) 20-30% of a lauric acid oil which is coconut oil;
  (c) 20-30% of an oleic acid oil selected from safflower oleic oil, sunflower oleic oil, and canola oil;
  (d) 14-21% of a linoleic acid oil selected from corn oil, safflower oil, soybean oil and sunflower oil; and
  (e) 10-25% of medium-chain triglycerides,
the amounts of the oils being such that the fat composition contains, per 100 parts by weight of total fatty acids present as triglycerides,
  (i) 8-18 parts of caprylic acid;
  (ii) 4-9 parts of capric acid;
  (iii) 10—parts of palmitic acid;
  (iv) 25-35 parts of oleic acid; and
  (v) 12-17 parts of linoleic acid.

40. A nutritionally complete food product adapted for human infant nutrition, comprising a protein source, a carbohydrate source, vitamins, minerals, and a preterm, all vegetable oil fat composition of claim 39.

41. A preterm, all vegetable oil fat composition according to claim 34, which comprises
  (a) 20% randomized palm olein oil;
  (b) 27% coconut oil;
  (c) 25% safflower oleic oil;
  (d) 18% soybean oil; and
  (e) 10% medium-chain triglycerides (MCTs)
the amounts of the oils being such that the fat compositions contain, per 100 parts by weight of total fatty acids present as triglycerides,
  (i) 8-9 parts of caprylic acid;
  (ii) 4-5 parts of capric acid;
  (iii) 12-13 parts of palmitic acid;
  (iv) 33-34 parts of oleic acid; and
  (v) 15-16 parts of linoleic acid.

42. A nutritionally complete food product adapted for human infant nutrition, comprising a protein source, a carbohydrate source, vitamins, minerals, and a preterm, all vegetable oil fat composition of claim 34.

43. A preterm, all vegetable oil fat composition particularly for use in a nutritionally complete preterm (or low birth weight) infant formula, said preterm, all vegetable oil fat composition comprising
  (a) 15-25% of a randomized palmitic acid oil selected from randomized palm oil or randomized palm olein oil;

(b) 20–30% of a lauric acid oil selected from coconut oil, babassu oil, and palm kernel oil;

(c) 20–30% of an oleic acid oil selected from safflower oleic oil sunflower oleic oil, and canola oil;

(d) 14–31% of a linoleic acid oil selected from corn oil, safflower oil, soybean oil and sunflower oil; and (e) 10–25% of medium-chain triglycerides, the amounts of the oils being such that the fat composition contains, per 100 parts by weight of total fatty acids present as triglycerides, (i) 8–18 parts of caprylic acid;
(ii) 4–9 parts of capric acid;
(iii) 10–14 parts of palmitic acid;
(iv) 25–35 parts of oleic acid; and
(v) 12–17 parts of linoleic acid.

44. A preterm, all vegetable oil fat composition according to claim 43 wherein the palmitic acid oil selected is randomized palm olein oil.

45. A preterm, all vegetable oil fat composition according to claim 43 wherein the lauric acid oil selected is coconut oil.

46. A preterm, all vegetable oil fat composition according to claim 43 wherein the oleic acid oil selected is safflower oleic oil.

47. A preterm, all vegetable oil fat composition according to claim 43 wherein the linoleic oil selected is soybean oil.

48. A preterm, all vegetable oil fat composition according to claim 43 wherein the medium-chain triglycerides (MCTs) comprise 60–70% caprylic acid and 25–35% capric acid.

49. A preterm, all vegetable oil fat composition according to claim 43 comprising (a) 20% randomized palm olein oil;
(b) 27% coconut oil;
(c) 25% safflower oleic oil;
(d) 18% soybean oil; and
(e) 10% medium-chain triglycerides (MCTs), the amounts of the oils being such that the fat compositions contain, per 100 parts by weight of total fatty acids present as triglycerides, (i) 9 parts caprylic acid;
(ii) 5 parts of capric acid;
(iii) 13 parts of palmitic acid;
(iv) 34 parts of oleic acid; and
(v) 16 parts linoleic acid.

50. A nutritionally complete food product adapted for human infant nutrition, comprising a protein source, a carbohydrate source, vitamins, minerals, and a preterm, all vegetable oil fat composition of claim 43.

* * * * *